United States Patent [19]
Blades et al.

[11] Patent Number: 5,448,693
[45] Date of Patent: Sep. 5, 1995

[54] METHOD AND SYSTEM FOR VISUALLY DISPLAYING INFORMATION ON USER INTERACTION WITH AN OBJECT WITHIN A DATA PROCESSING SYSTEM

[75] Inventors: Jerry A. Blades; Harvey G. Kiel, both of Rochester; Raymond F. Romon, Oronoco, all of Minn.

[73] Assignee: International Business Machines Corporation, Armonk, N.Y.

[21] Appl. No.: 998,809

[22] Filed: Dec. 29, 1992

[51] Int. Cl.⁶ ............................................. G06F 3/00
[52] U.S. Cl. .................................................... 395/159
[58] Field of Search .............................. 395/155–161

[56] References Cited

U.S. PATENT DOCUMENTS

| | | | |
|---|---|---|---|
| 4,536,646 | 8/1985 | Adams et al. | 235/377 |
| 4,612,623 | 9/1986 | Barzarnik | 364/569 |
| 4,653,090 | 3/1987 | Hayden | 379/204 |
| 4,731,791 | 12/1987 | Saluski | 364/900 |
| 5,010,560 | 4/1991 | Janney et al. | 377/20 |
| 5,075,675 | 12/1991 | Barker et al. | 345/120 |
| 5,237,653 | 8/1993 | Noguchi et al. | 395/158 |
| 5,301,348 | 4/1994 | Jaaskelainen | 395/800 |

OTHER PUBLICATIONS

"Display device for information processor", Hideki Hashikura, JP application #02-217,148, Abstract publication #04-100144, Jul. 22, 1992, vol. 16, No. 337 (p. 1390) [5380].

Dec. 1984, IEEE CG&A, "The User Interface for Sapphire" by: Brad A. Myers, University of Toronto.

Primary Examiner—Mark R. Powell
Assistant Examiner—Ba Huynh
Attorney, Agent, or Firm—Owen Gamon; Andrew J. Dillon

[57] ABSTRACT

A method and system for visually altering characteristics of an iconic representation in response to a user's interaction with an object within a data processing system. The user initially associates an iconic representation for each object and selects the information to be monitored for each object. Parameters which may be monitored include the number of times the user interacts with the object, the amount of time the user spent interacting with the object, or the passage of time. This information is then stored in a database. The user's interaction with each object is then monitored, and the visual characteristics of the iconic representations associated with each object are then altered in response to the user's interaction with each object.

4 Claims, 7 Drawing Sheets

Increasing color or intensity

METHOD AND SYSTEM FOR VISUALLY DISPLAYING INFORMATION ON USER INTERACTION WITH AN OBJECT WITHIN A DATA PROCESSING SYSTEM

BACKGROUND OF THE INVENTION

1. Technical Field

The present invention relates in general to data processing systems, and in particular to a method and system in a data processing system for visually displaying information to a user. Still more particularly, the present invention relates to a method and system for visually displaying information on user interaction with an object within the data processing system.

2. Description of the Related Art

Present data processing systems are capable of providing a user with large amounts of information, through networks, databases, applications and other objects. As data processing systems become more powerful in the future, the need to monitor a user's interaction with an object will increase. A user may want to interact with an object in the future, and would like to be reminded of that desire as time passes. Alternatively, a user may want to know which objects he or she has interacted with in the past, how many times, and/or how much time was spent interacting with each object.

Those skilled in the art will appreciate that methods exists for monitoring an object or application. U.S. Pat. No. 4,713,791, Saluski, entitled Real Time Usage Meter for a Processor System, issued Dec. 15, 1987, exemplifies a technique for displaying the percentage of real time consumed by software tasks in a processing system. This method allows the amount of real time consumed by software tasks to be monitored by the system's user. A display device, separate from a display terminal of a computer, includes a control panel having an analog percentage meter and a number of light emitting diodes (LEDs). The relative percentages of different real time tasks are displayed by the relative intensities of particular LEDs in the display. To implement this method, a combination of additional hardware logic and modifications to software are required.

The technique taught by Saluski has several disadvantages. First, a combination of hardware logic and software modifications are required to implement this system. Second, a display device separate from a computer display terminal is required. Third, the number of objects a user may monitor is limited. Furthermore, the user may not define the manner in which the information is displayed. And, although the technique in Saluski monitors on the amount of real time consumed by software a limited basis, the system does not monitor any other types of user interaction. Finally, the information provided by this system is limited to information about an application in software. Saluski does not disclose monitoring a user's interaction with an application or object.

U.S. Pat. No. 4,536,646, Adams et al., entitled Time Accounting System, issued Aug. 20, 1985, teaches a method for generating data to be input into a computer which represents the amount of time a user has spent at a workstation performing a task. A portable device is carried by a user and connected to a workstation in order to monitor the work performed by the user. The portable device automatically and periodically writes into a memory circuit data relating to the work being performed by the user. After a period of time, the memory circuit is collected from the portable device and the data is retrieved for recording.

The method taught by Adams et al. also has several disadvantages. First, a portable device is required to implement the method. Second, a display device separate from a computer display terminal is required. Third, the number type of information which is monitored is limited to the amount of time a user has spent at a workstation. Furthermore, the user may not define the manner in which the information is displayed, nor does it monitor other types of information.

Therefore, it would be desirable to provide a method and system for visually displaying information on user interaction with an object within a data processing system. It is also desirable that the method and system be capable of monitoring a variety of information about the user's interaction with the object.

SUMMARY OF THE INVENTION

It is therefore one object of the present invention to provide a method and system for providing information to a user on the user's interaction with an object within a data processing system.

It is another object of the present invention to provide a method and system for visually displaying the information to the user on the user's interaction with the object within the data processing system.

It is yet another object of the present invention to visually display the information to the user where the user may define the parameters to be monitored and the manner in which the information is displayed.

The foregoing objects are achieved as is now described. In the preferred embodiment, the information is displayed to the user by altering the color or intensity settings of iconic representations for each object. The user initially associates an iconic representation for each object and selects the information to be monitored for each object. Parameters which may be monitored include the number of times the user interacts with the object, the amount of time the user spent interacting with the object, or the passage of time. This information is then stored in a database. The user's interaction with each object is then monitored. The visual characteristics of the iconic representations associated with the objects are then altered in response to the user's interaction with each object.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
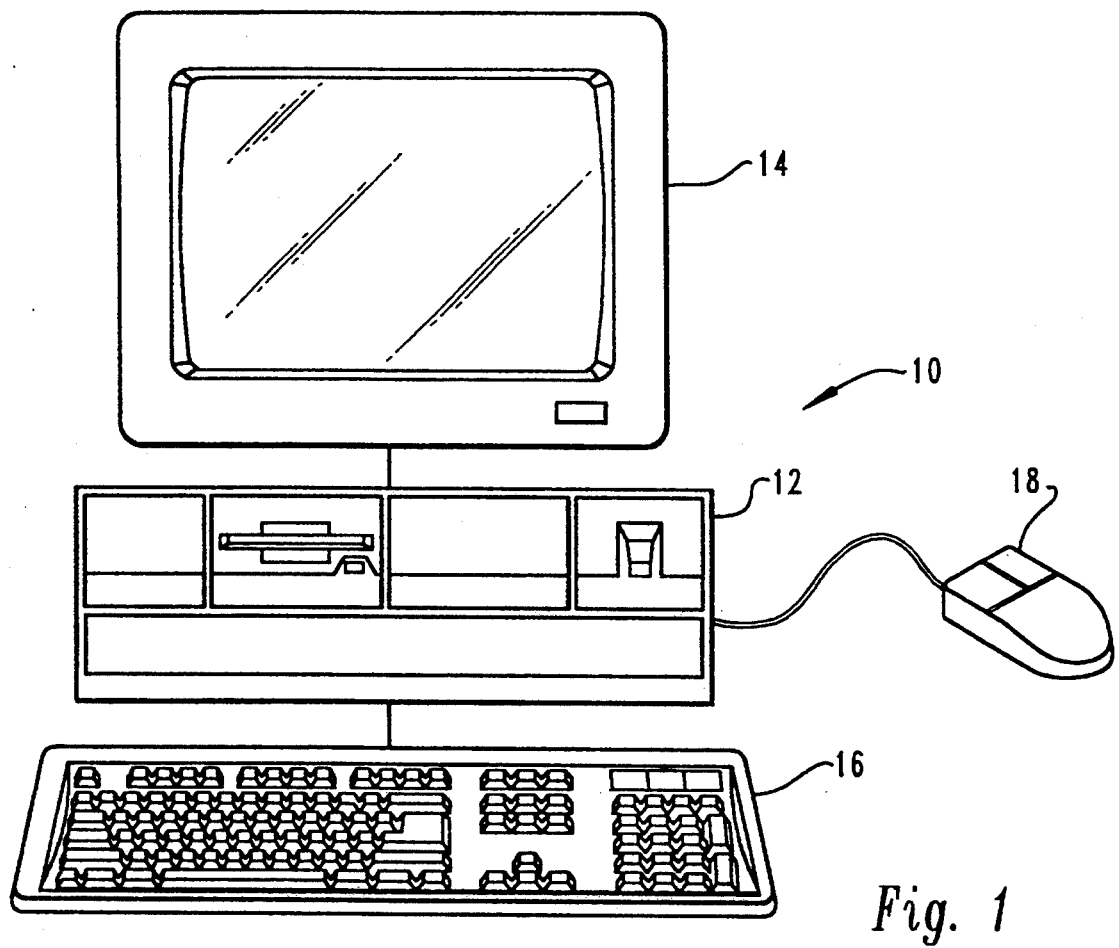
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. Data processing system 10 includes a system unit 12, a display terminal 14, a keyboard 16 and an input device 18, illustrated as a mouse driver. Data processing system 10 may be implemented utilizing any suitable computer, such as an IBM PS/2 computer, a product of International Business Machines Corporation, located in Armonk, N.Y. "PS/2" is a registered trademark of International Business Machines Corporation.

Although the preferred embodiment is described with reference to a personal computer, the present invention may also be implemented in other types of data processing systems, examples being intelligent workstations, mini computers or portable devices.

In the preferred embodiment, a user may define the information or parameters to be monitored for each object. Thus, a user may want to know which objects he or she has interacted with in the past, how many times, and how much time was spent interacting with each object. Additionally, a user may want interact with an object in the future, and would like to be reminded of that desire as time passes. Or the user may want to monitor any of these, or other parameters, in combination with each other.

In the preferred embodiment, the information regarding user interaction with each object is displayed to the user by visually altering the characteristics of iconic representations associated with each object. The user initially associates an iconic representation for each object and selects the information to be monitored for each object. As the user interacts with the objects, the data concerning the interaction is stored in the database. The iconic representations for each object are then visually altered in response to the user's interaction.

One technique which may be utilized to present the information to the user is by visually altering the color or intensity settings for the iconic representations. The database may be used to provide the coloration or intensity settings for the iconic representations. Alternatively, the color or intensity settings may be defined by the user.

Figure 2:
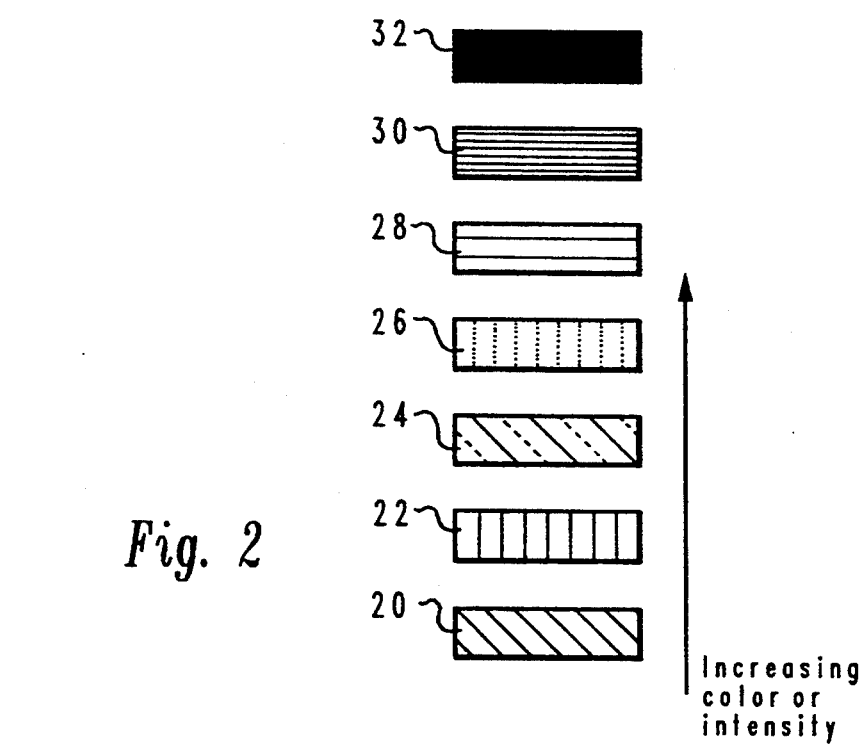
FIG. 2 is a pictorial representation which illustrates a user defined color intensity chart to be utilized in conjunction with FIGS. 3a–3d according to the present invention.

FIG. 2 is a pictorial representation which illustrates a user defined color intensity chart to be utilized in conjunction with FIGS. 3a–3d according to the present invention. Block 20 represents a default color or intensity setting. This color/intensity setting may be used for those iconic representations which the user is not monitoring his or her interaction with the corresponding objects, or block 20 may represent a starting or finishing color/intensity setting. Blocks 22–32 depict increasing color/intensity settings, which will be utilized in FIGS. 3a–3d.

Figure 3A:
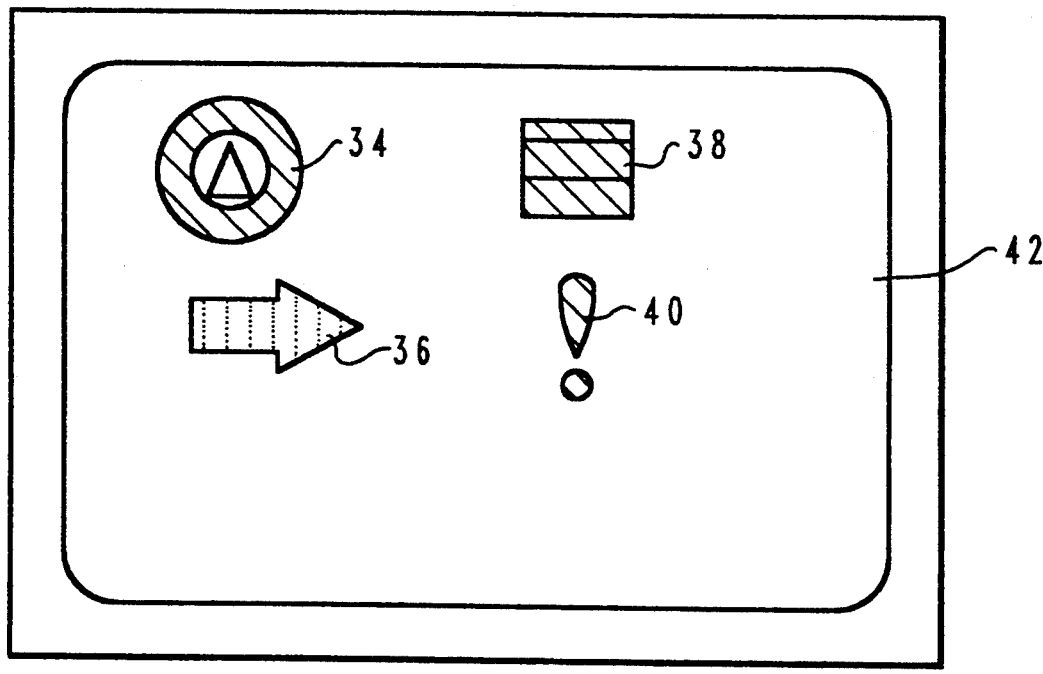
FIGS. 3a–3d depict a display screen displaying the visually altering of characteristics of iconic representations according to the present invention.

FIGS. 3a–3d show a display screen with the characteristics of the iconic representations visually altered according to the present invention. Referring to FIG. 3a, four iconic representations 34, 36, 38, 40 are displayed on a display screen 42. By way of example only, assume the user desires to have iconic representation 34 monitored for the number of times the user interacted with the object represented by iconic representation 34. Additionally, assume the user defined a "forget" rating for iconic representation 34. A "forget" rating allows a user to decide that for a certain number of interactions, the color/intensity setting should increase or decrease, or be set to a particular setting. For example, a forget rating of 1 interactions per month would mean that iconic representation 34 would be a decreased certain color/intensity whenever a month had passed and the user had not interacted with the object that month. Iconic representation 34 would maintain its color/intensity setting when the user interacted with the object only once within the month. The color/intensity setting of iconic representation 34 would increase whenever a month passed and the user had interacted more than once with the object associated with iconic representation 34.

Continuing with the example, assume the user desires to have the object represented by iconic representation 36 to provide information on how much time has passed since he or she interacted with the object represented by iconic representation 36. Additionally, assume the user defined an age limit for iconic representation 36. A age limit allows a user to decide that after a certain amount of time has passed, iconic representation 36 should have a default color/intensity, or be archived. For example, an age limit of one year means that if a year passes and the user has not interacted with the object represented by iconic representation 36, iconic representation 36 would be set to a default color/intensity setting. Since the user has interacted with object represented by iconic representation 36, the color/intensity setting is higher than iconic representations 34, 38, 40.

Iconic representation 38 is to provide information on how much time the user spends interacting with the object represented by iconic representation 38. Lastly, iconic representation 40 represents an object that the user wants to interact with in the future.

Figure 3B:
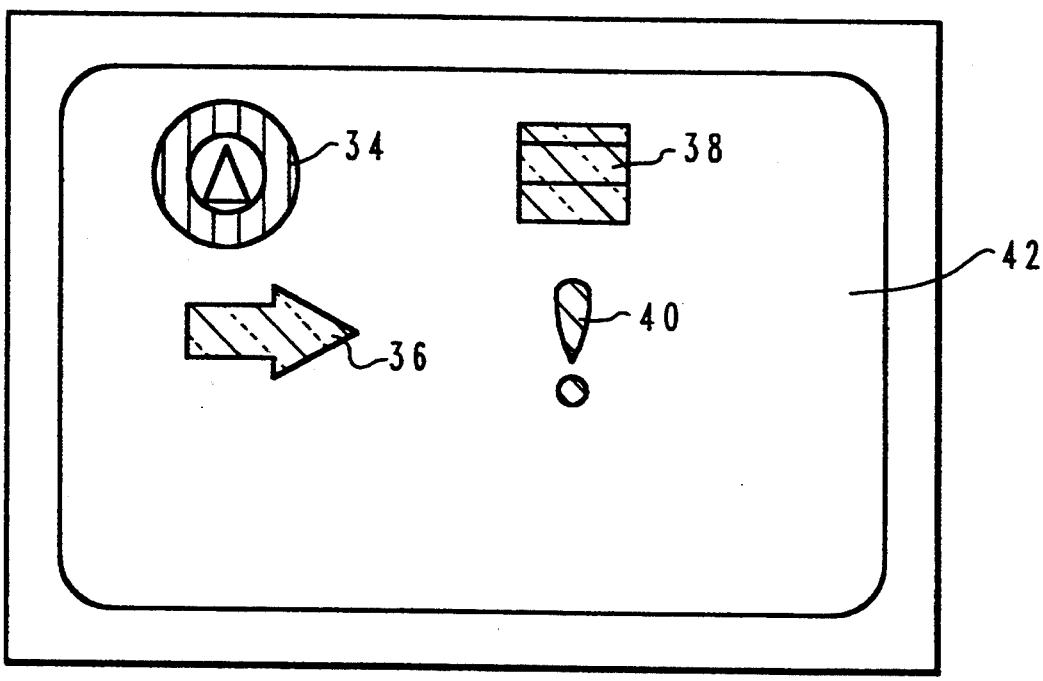

Referring to FIG. 3b, the user has interacted with the object represented by iconic representation 34 a number of times. Thus, the circle in iconic representation 34 has been set to the color/intensity setting of block 22 in FIG. 2, an increased color/intensity setting. The color/intensity setting for iconic representation 36 has decreased, from block 26 to block 24 in FIG. 2. This decrease is due to the fact that a specified amount of time has passed since the user last interacted with the object represented by iconic representation 36.

The user also interacted with the object associated with iconic representation 38. Therefore, the color/intensity setting of iconic representation 38 has increased from block 20 to block 24 in FIG. 2. The color/intensity setting for iconic representation 40, however, has not changed. This is due to the fact that the specified amount of time which has to pass before the color/intensity setting changes has not passed. The specified amount of time which has to pass before the color/intensity setting changes may be determined by the user, or may be automatically determined by the object or an internal clock.

In the preferred embodiment, the color/intensity settings of iconic representations do not have to change at the same rate. The color/intensity setting may decrease or increase linearly, non-linearly, exponentially or by an equation. Whether the color/intensity setting increases or decreases, and the rate at which it does so, may all be defined by the user in the preferred embodiment.

Figure 3C:
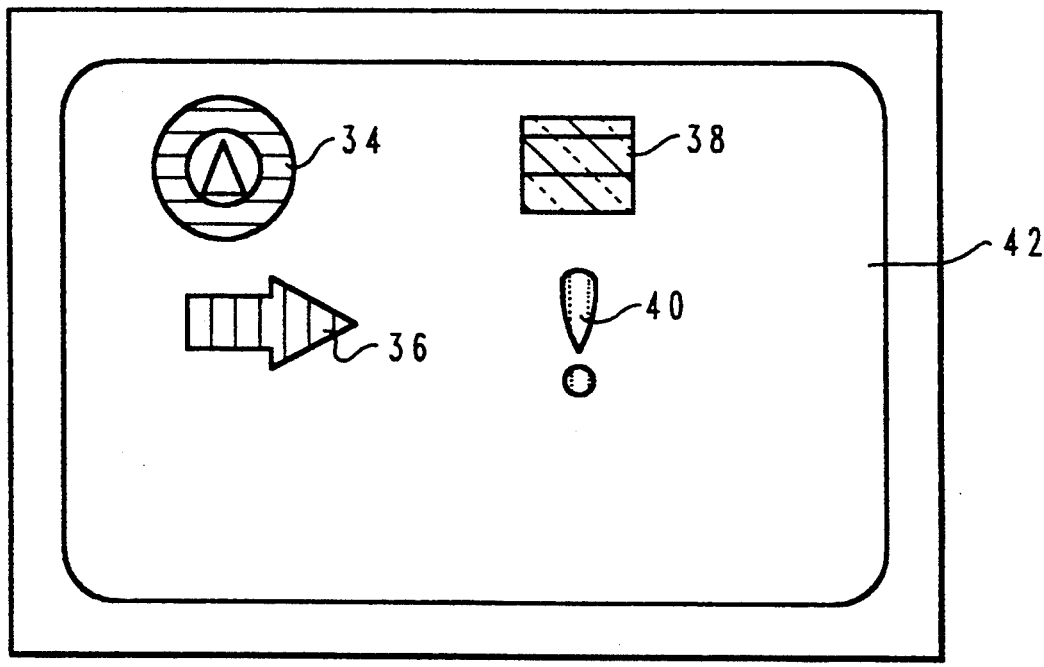

FIG. 3c depicts the circle in iconic representation 34 having an increased color/intensity setting, from block 22 to block 28 in FIG. 2. This is due to the increased user's interaction with the object represented by iconic representation 34. Iconic representation 36 has a decreased color/intensity setting, from block 24 to block 22. Again, this decrease is due to the fact that a specified amount of time has passed since the user last interacted with the object represented by iconic representation 36.

The color/intensity setting of iconic representation 38 has not changed, since the user has not interacted with the object associated with iconic representation 38. And, since a specified amount of time has passed, iconic representation 40 has an increased color/intensity setting, from block 20 to block 26. This increase in color/intensity setting informs the user that it is becoming more important to interact with the object associated with iconic representation 40 as time passes.

Figure 3D:
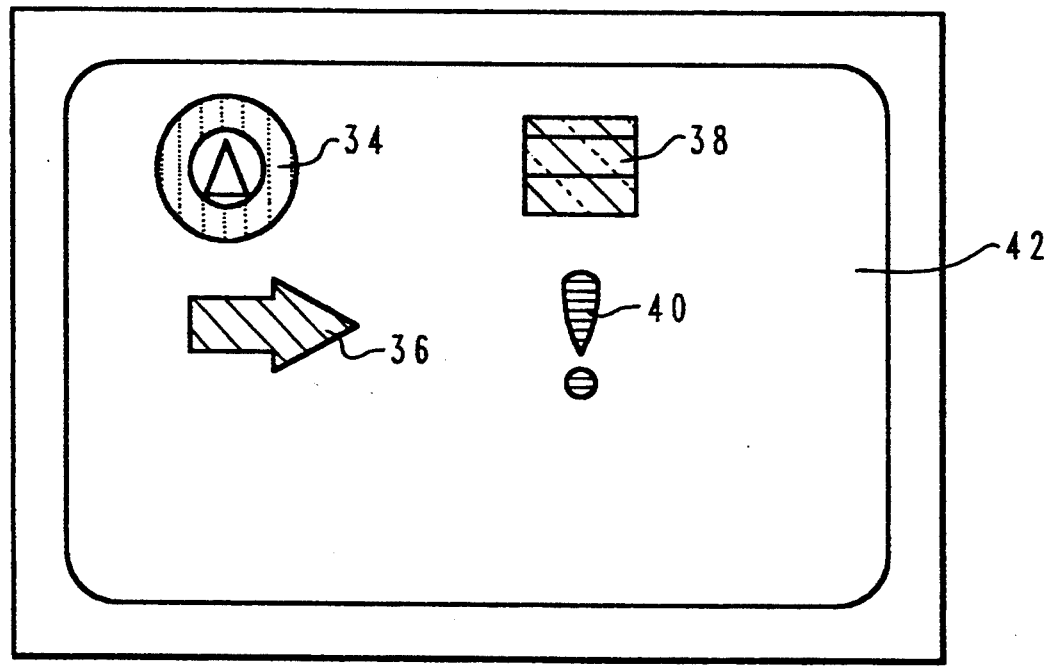

FIG. 3d depicts the circle in iconic representation 34 having a decreased color/intensity setting. This is due to the "forget" rating. Since the user did not interact with the object represented by iconic representation 34 a number of times above the "forget" rating, the color/intensity setting decreased. The color/intensity setting for iconic representation 36 has decreased, while the color/intensity setting of iconic representation 38 has not changed. The color/intensity settings are due to the user's lack of interaction with the objects associated with iconic representations 36, 38. And finally, since more time has passed, iconic representation 40 has an increased color/intensity setting, from block 26 to block 30 in FIG. 2. This increase in color/intensity setting informs the user that it is becoming more important to interact with the object associated with iconic representation 40.

Figure 4:
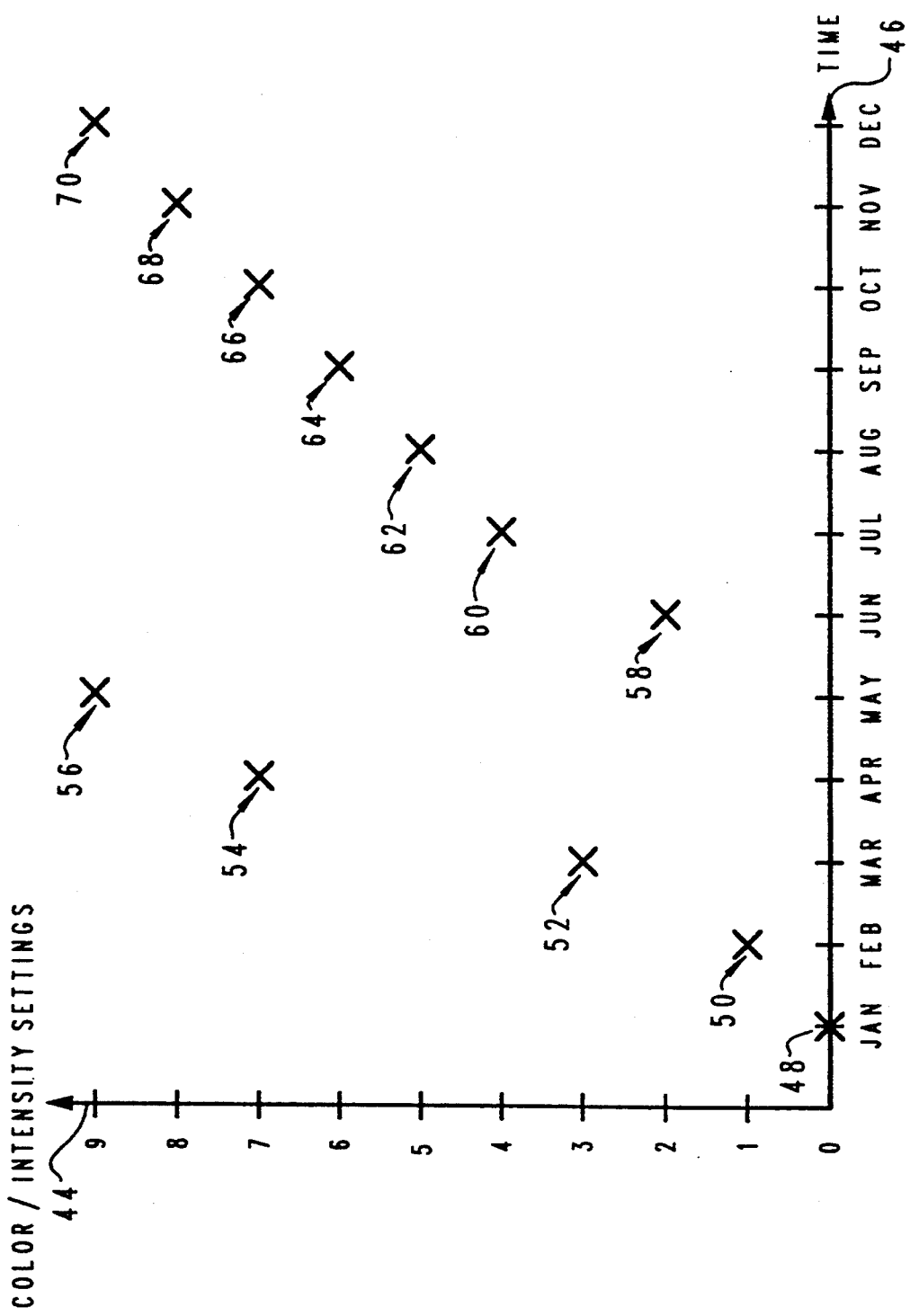
FIG. 4 is a graph illustrating one implementation of the present invention.

Referring to FIG. 4, a graph illustrating one implementation of the present invention is depicted. A graph having a Y axis 44 and an X axis 46 is a method for establishing the color/intensity settings for an iconic representation or a group of iconic representations. The graph will be referred to as a vitality curve. FIG. 4 depicts a user establishing the vitality curve for a one year time period. Those skilled in the art will appreciate that the time frame may be tailored for a user's particular needs.

The user plots the color/intensity settings for the iconic representation on the graph. As can be seen, in January the user placed point 48 on O, which may mean the iconic representation is archived and does not appear on the display screen, or the color/intensity setting is a default color/intensity setting. In February, the user established a color/intensity setting at level 2, as shown by point 50. The color intensity setting continues to increase in a non-linear manner, as illustrated by points 52, 54, 56. Thus, the user will see the color/intensity setting of the iconic representation increasing on the display screen. In June, however, the user desires the color/intensity setting to be reduced to level 2, as shown by point 58. Thereafter, until the end of the year, the user wants the color/intensity setting to increase linearly, as depicted by points 60–70. Thus, each month the color/intensity setting of the iconic representation will increase one level per month, beginning at level 4.

By way of example only, assume the user has a database for possible vacation locations and plans to take two trips during the year. One trip will be in May, the other trip in December. The user determines that the iconic representation for this database needs to increase as the time for the two trips gets closer, and then peak to maximum color/intensity setting the month of the trips. The vitality curve in FIG. 4 represents one method for plotting the user's desired color/intensity settings for the iconic representation associated with the vacation database for the year.

Figure 5:
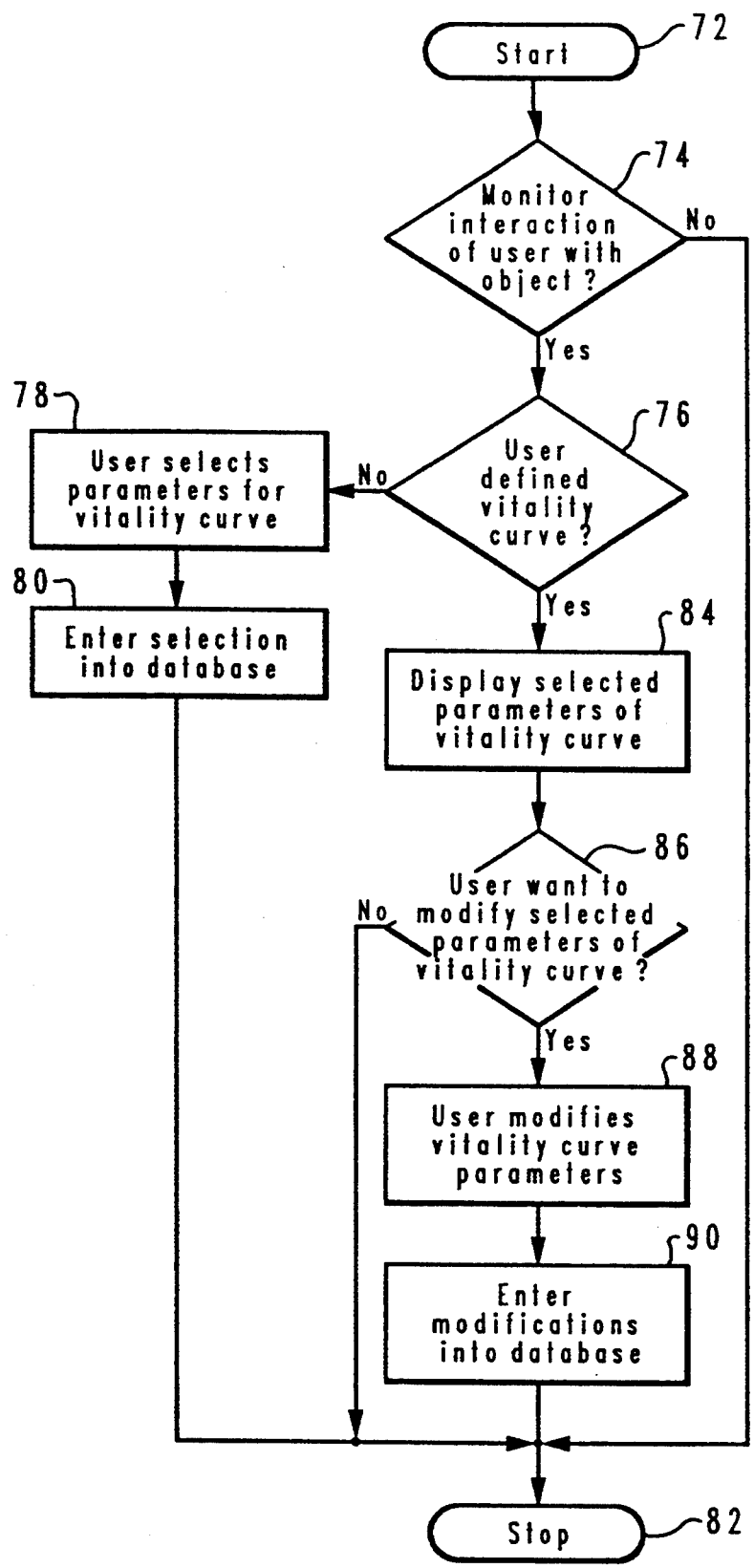
FIG. 5 is a high level logic flow chart illustrating a technique for implementing the method and system of FIG. 4.

FIG. 5 is a high level logic flow chart illustrating a process for implementing the method and system of FIG. 4. The process begins at block 72, and thereafter passes to block 74. Block 74 depicts a determination of whether or not the user wants to monitor his or her interaction with an object. If the user does want to monitor his or her interaction, the process continues at block 76 with a determination of whether or not the user has defined a vitality curve for the object.

If the user has not defined a vitality curve for the iconic representation associated with the object, the user then creates the vitality curve, as shown in block 78. Block 80 depicts entering the data on the vitality curve into a database. The process then ends, as illustrated in block 82.

Referring again to block 76, if the user has defined a vitality curve, the process continues at block 84, which depicts displaying the vitality curve defined by the user. A determination is then made as to whether or not the user wishes to modify the vitality curve, as shown in block 86. If the user does not want to modify the vitality curve, the process passes to block 82, where it ends. If the user does want to modify the vitality curve, block 88 illustrates the user modifying the vitality curve. The modifications are then entered into the database, as shown in block 90, and the process ends.

Figure 6:
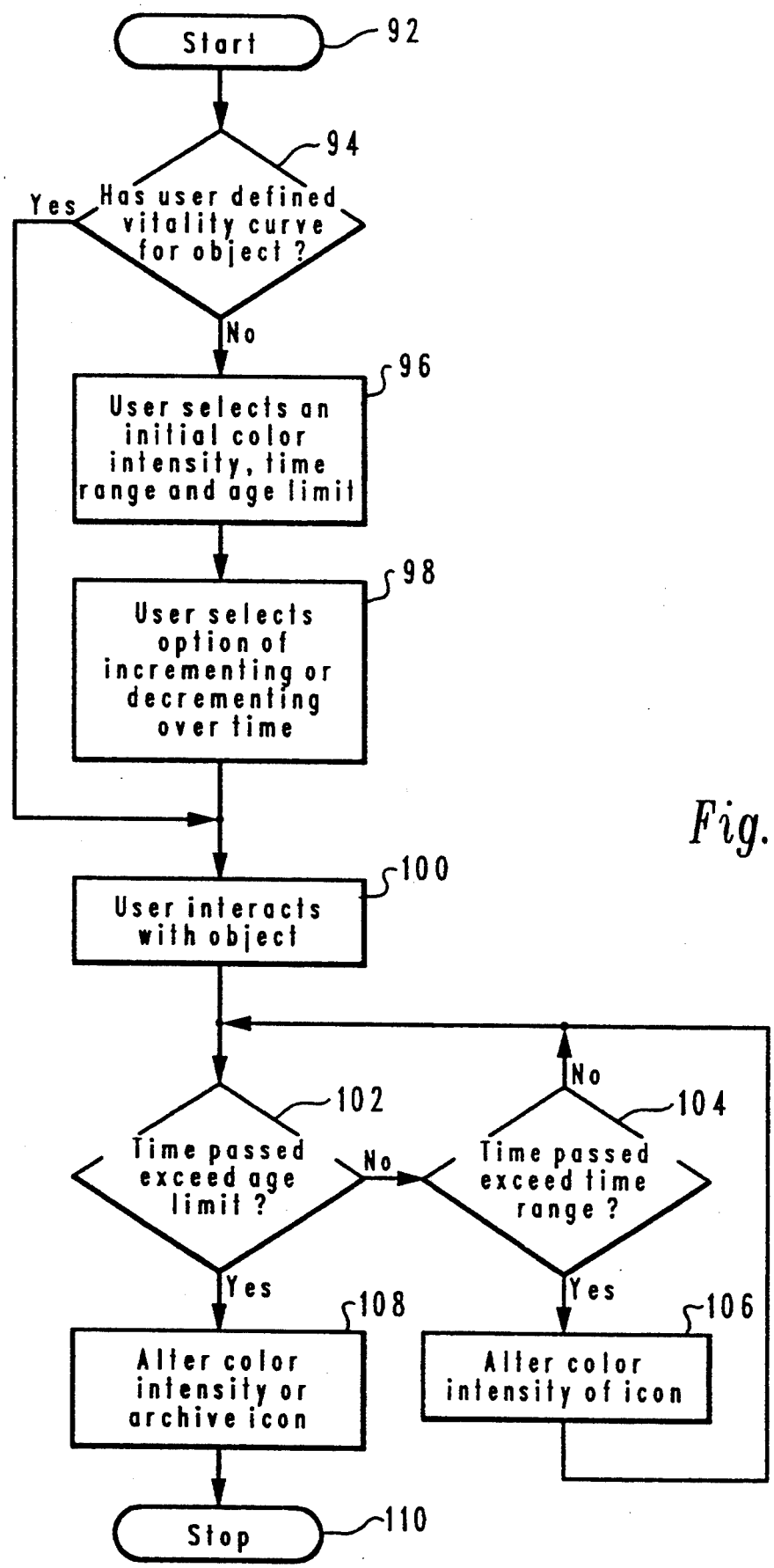
FIG. 6 is a high level logic flow chart illustrating a technique for implementing the method and system of FIGS. 3a–3d.

Referring to FIG. 6, a high level logic flow chart illustrates a technique for implementing the method and system of FIGS. 3a–3d. The process depicted in FIG. 6 illustrates a technique for visually altering the characteristics of an iconic representation over time. The process begins at block 92, and thereafter passes to block 94. Block 94 depicts a determination of whether or not the user has defined a vitality curve for the iconic representation. If the user has not defined a vitality curve, the process continues at block 96 with the user selecting various parameters associated with the altering of the iconic representation over time. The user needs to select an initial color/intensity setting, a time range for altering the characteristics of the iconic representation, and, if desired, an age limit. Next, the user needs to decide if he or she wants the color/intensity setting to increase or decrease over time. This step is illustrated in block 98. Thereafter, the process continues at block 100. Referring again to block 94, if the user has defined a vitality curve, the process jumps to block 100.

Block 100 depicts the user interacting with the object, thereby causing the iconic representation associated with the object to be set to the initial color/intensity setting, as well as starting the clock in terms of monitoring the passage of time. Next, a determination is made as to whether or not the amount of time passed exceeds the user defined age limit, as shown in block 102. If the amount of time which has passed has not exceeded the age limit, the process continues at block 104. Block 104 illustrates a determination of whether or not the amount of time which has passed exceeds the user selected time range for altering the characteristics of the iconic representation. If the amount of time which has passed exceeds the time range, the characteristics of the iconic representation are altered, as shown in block 106. Thereafter, the process returns to block 102 for continued monitoring of the passage of time.

If the amount of time which has passed does not exceed the time range, the process returns to block 102 for continued monitoring of the passage of time. If the user selected an age limit, eventually the amount of time which has passed will exceed the age limit. When this occurs, the process passes to block 108, where the characteristics of the iconic representation are altered to a color/intensity setting selected by the user. This setting may be a default color. Alternatively, the iconic representation may be archived, upon which the user must retrieve the iconic representation when he or she wants to use it again or associate it with a different object. Following block 108, the process ends, as shown in block 110.

Figure 7:
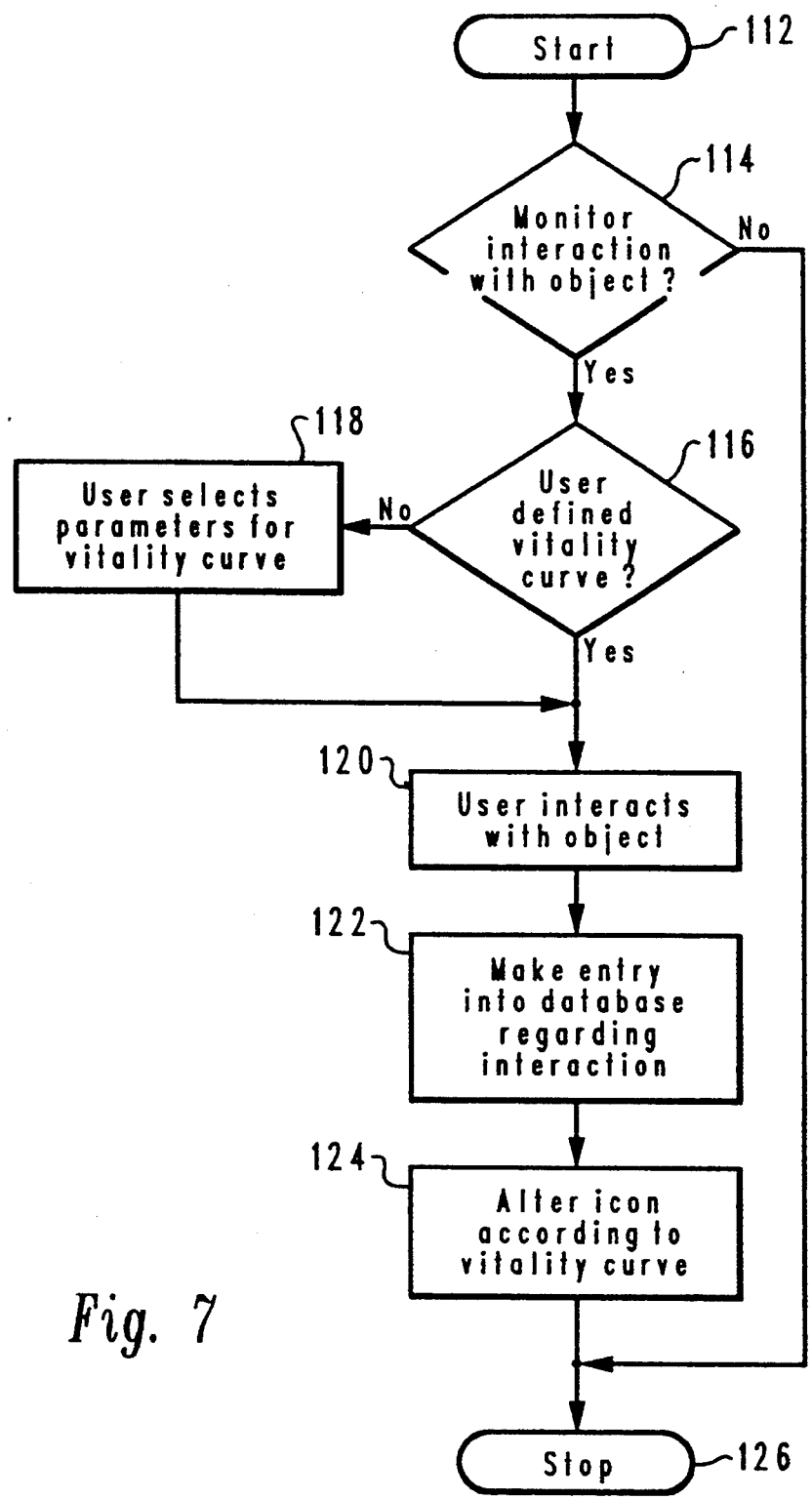
FIG. 7 is a high level logic flow chart illustrating a technique for implementing the method and system of FIG. 3a–3d.

FIG. 7 is a high level logic flow chart illustrating a technique for implementing the method and system of FIG. 3a–3d. The process depicted in FIG. 7 illustrates a technique for visually altering the characteristics of an iconic representation in response to user interaction with the object associated with the iconic representation. The process begins at block 112, and thereafter passes to block 114. Block 114 depicts a determination of whether or not a user wants to monitor his or her interaction with the object. If the user does wish to monitor their interaction, the process continues with block 116. Block 116 illustrates a determination of whether or not the user has defined a vitality curve for the iconic representation. If the user has not defined a vitality curve, the user may do so, as shown in block 118.

If the user has defined a vitality curve, block 120 depicts the user interacting with the object. Thereafter, as shown in block 122, an entry is made in the database regarding the user's interaction with the object. If the user wants to monitor the amount of time spent interacting with the object, that information is stored in the database. If the user wants to have a timestamp of when the user last interacted with the object, that information is stored in the database. Whatever information or parameters the user wants to monitor, individually or in combination with other parameters, the information is stored in the database, and is then utilized to alter the characteristics of the iconic representation associated with the object.

Block 124 illustrates the step of visually altering the characteristics of the iconic representation associated with the object. Thereafter, as shown in block 126, the process ends.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for visually displaying information in response to a user's interaction with an object, said method comprising the steps of:

associating an iconic representation with said object, wherein said iconic representation includes visually alterable characteristics;

specifying one or more parameters which each correspond to a selected type of user interaction with said object;

monitoring said user's interaction with said object within said data processing system; and altering said visually alterable characteristics only in response to interaction with said object by said user of a selected type which corresponds to said specified one or more parameters by altering said visually alterable characteristics by a color or intensity setting in response to an amount of time said user interacted with said object.

2. A data processing system for visually displaying information in response to a user's interaction with an object, said data processing system comprises:

means for associating an iconic representation with said object, wherein said iconic representation includes visually alterable characteristics;

means for specifying one or more parameters which each correspond to a selected type of user interaction with said object;

means for monitoring said user's interaction with said object within said data processing system; and means for altering said visually alterable characteristics only in response to interaction with said object by said user of a selected type which corresponds to said specified one or more parameters by altering said visually alterable characteristics by a color or intensity setting in response to an amount of time said user interacted with said object.

3. A method in a data processing system for visually displaying information in response to a user's interaction with an object, said method comprising the steps of:

associating an iconic representation with said object, wherein said iconic representation includes visually alterable characteristics;

specifying one or more parameters which each correspond to a selected type of user interaction with said object;

monitoring said user's interaction with said object within said data processing system; and altering said visually alterable characteristics only in response to interaction with said object by said user of a selected type which corresponds to said specified one or more parameters by altering said visually alterable characteristics by a color or intensity setting in response to a total number of times said user interacted with said object.

4. A data processing system for visually displaying information in response to a user's interaction with an object, said data processing system comprises:

means for associating an iconic representation with said object, wherein said iconic representation includes visually alterable characteristics;

means for specifying one or more parameters which each correspond to a selected type of user interaction with said object;

means for monitoring said user's interaction with said object within said data processing system; and means for altering said visually alterable characteristics only in response to interaction with said object by said user of a selected type which corresponds to said specified one or more parameters by altering said visually alterable characteristics by a color or intensity setting in response to a total number of times said user interacted with said object.

* * * * *